(12) United States Patent
Oaki et al.

(10) Patent No.: US 7,590,277 B2
(45) Date of Patent: Sep. 15, 2009

(54) PATTERN INSPECTING METHOD

(75) Inventors: Junji Oaki, Kanagawa-Ken (JP); Shinji Sugihara, Tokyo (JP); Ikunao Isomura, Kanagawa-Ken (JP); Toru Tojo, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 908 days.

(21) Appl. No.: 11/175,360

(22) Filed: Jul. 7, 2005

(65) Prior Publication Data

US 2006/0018530 A1   Jan. 26, 2006

(30) Foreign Application Priority Data

Jul. 15, 2004   (JP)   ............... 2004-208314

(51) Int. Cl.
*G06K 9/00*   (2006.01)
(52) U.S. Cl. ..................................... 382/141
(58) Field of Classification Search ........................ None
See application file for complete search history.

(56) References Cited

U.S. PATENT DOCUMENTS

| 4,805,123 | A * | 2/1989 | Specht et al. ............... 382/144 |
| 6,625,332 | B1 * | 9/2003 | Nakao ........................ 382/294 |
| 7,366,343 | B2 * | 4/2008 | Takeuchi ..................... 382/145 |
| 2002/0122990 | A1 * | 9/2002 | Inoue .............................. 430/5 |

FOREIGN PATENT DOCUMENTS

| JP | 7-318506 | 12/1995 |
| JP | 8-76359 | 3/1996 |
| JP | 8-297692 | 11/1996 |
| JP | 10-096613 | 4/1998 |
| JP | 10-155139 | 6/1998 |
| JP | 11-153550 | 6/1999 |
| JP | 2000-105832 | 4/2000 |
| JP | 2000-241136 | 9/2000 |
| JP | 2000-348177 | 12/2000 |
| JP | 2003-287419 | 10/2003 |
| JP | 2003-315981 | 11/2003 |
| JP | 2006-030518 | 2/2006 |

OTHER PUBLICATIONS

U.S. Appl. No. 11/567,550, filed Dec. 6, 2006, Oaki.
U.S. Appl. No. 11/567,520, filed Dec. 6, 2006, Oaki.
U.S. Appl. No. 11/360,584, filed Feb. 24, 2006, Oaki et al.
U.S. Appl. No. 11/360,657, filed Feb. 24, 2006, Oaki et al.
U.S. Appl. No. 11/360,813, filed Feb. 24, 2006, Oaki et al.
U.S. Appl. No. 11/360,581, filed Feb. 24, 2006, Oaki.
U.S. Appl. No. 11/386,744, filed Mar. 23, 2006, Sugihara et al.

* cited by examiner

*Primary Examiner*—Matthew C Bella
*Assistant Examiner*—Alex Liew
(74) *Attorney, Agent, or Firm*—Oblon, Spivak, McClelland, Maier & Neustadt, L.L.P.

(57) ABSTRACT

The present invention is to allow rapid detection of such a defect as buried in a pixel positional deviation, expansion/contraction noise or sensing noise on an image. A relationship between an inspection reference pattern image and a pattern image to be inspected is identified during inspection to construct a mathematical model obtained by absorbing (applying fitting on) a pixel positional deviation, expansion/contraction noise or sensing noise on an image, and a defect is detected by comparing a new inspection reference pattern image (model image) obtained by simulating the mathematical model and a pattern image to be inspected.

11 Claims, 10 Drawing Sheets

ENLARGEMENT OF DEFECT POINT

DATABASE IMAGE FOR REFLECTION

FIG. 8A

DATABASE IMAGE FOR REFLECTION + RESIZING + BURRING FILTER IMAGE

FIG. 8B

SENSOR IMAGE OBTAINED BY REFLECTION ILLUMINATION (PINHOLE DEFECT DETECTABLE)

FIG. 8C

SENSOR IMAGE OBTAINED BY TRANSMISSION ILLUMINATION (PINHOLE DEFECT UNDETECTABLE)

FIG. 8D

WHITE AND BLACK REVERSION OF SENSOR IMAGE OBTAINED BY TRANSMISSION ILLUMINATION (PINHOLE DEFECT UNDETECTABLE)

BIRD-EYE VIEW OF DEFECT IMAGE

BIRD-EYE VIEW OF DEFECT IMAGE

FIG. 10C

PATTERN INSPECTING METHOD

CROSS-REFERENCE TO RELATED APPLICATION

This application is based upon and claims the benefit of priority from prior Japanese Patent Application No. 2004-208314 filed on Jul. 15, 2004 in Japan, the entire contents of which are incorporated herein by reference.

BACKGROUND OF THE INVENTION

1. Field of the Invention

The present invention relates to a pattern inspecting method for inspecting presence/absence of a pattern defect in a sample, and in particular to a pattern inspecting method used in a pattern inspecting apparatus for inspecting presence/absence of a defect in a fine pattern formed on a transfer mask for lithography used for LSI manufacturing.

2. Related Art

In general, since much cost for LSI manufacturing is required, it is inevitable to improve yield. As one of factors causing reduction in yield, there is a pattern defect in a transfer mask used when a fine pattern is exposed/transferred on a semiconductor wafer by a lithographic technique. In recent years, according to advance of fineness of a dimension of an LSI pattern formed on a semiconductor, the minimum dimension of a defect to be detected becomes fine. Therefore, it is necessary to provide high precision to a pattern inspecting apparatus for inspecting presence/absence of a defect in a transfer mask for lithography used in LSI manufacturing.

Methods for inspecting presence/absence of a defect on a fine pattern of a transfer mask for lithography are roughly classified to Die to Die comparison and Die to Database comparison. The Die to Die comparison is a method for detecting a defect by comparing two dies on a transfer mask, while the Die to Database comparison is a method for detecting a defect by comparing a die and database generated from CAD data for LSI design. The former method has such an advantage that it is unnecessary to prepare database, but it has such a disadvantage that common detect to two dies can not be found. The latter method has such an advantage that there is not any influence due to the common defect, but it has such a disadvantage that it is required to provide a large-scale circuit for generating database.

On the other hand, as a method other than the above methods, there is a comparison method based upon a simultaneous transmission/reflection illumination inspection (see JP-A-08-76359, for example). The comparison method is attached with a trade name "STARlight (Simultaneous Transmission And Reflection light). The method is a method where transmission illumination and reflection illumination are prepared in an optical system and respective images obtained by irradiating the respective illuminations on a transfer mask are compared with each other, which has such a merit that defect detection can be achieved without requesting generation of database even in one chip (two dies which can be compared with each other on a transfer mask are not present). This principle is based upon such a fact that database is complied by using, for example, a neural network to learn correlation between images obtained by transmission illumination and images obtained by reflection illumination in advance in detail, and presence of a defect is determined when the result of comparison of an image of a transfer mask obtained by transmission illumination and an image thereof obtained by reflection illumination deviates from the correlation database.

Incidentally, it is considered that it is difficult to cause the correlation database to function properly when a pixel positional deviation occurs between an image obtained by transmission illumination and an image obtained by reflection illumination or when the both illuminations are different in magnification from each other. Thus, the correlation database includes such a demerit that flexibility is lost in mechanical designing for an inspecting optical system. For example, since a mechanism for an optical system which allows simultaneous acquisition of an image obtained by the transmission illumination and an image obtained by the reflection illumination can not be constructed, the optical system mechanism is limited to such a mechanism that, after an image obtained by transmission illumination is acquired, an image obtained by reflection illumination is acquired. A merit of this method can not be utilized up to the maximum extent regarding its throughput.

Conventionally, as a method for comparing two images of an inspection reference pattern and a pattern to be inspected with each other, such a method is conducted that differences in coordinates between corresponding pixels are calculated and these differences are compared with each other (level comparison), or differences in coordinates between adjacent pixels are calculated and differences between corresponding adjacent pixels are compared with each other (adjacent difference comparison). This approach is called "direct comparison method".

In recent years, however, it becomes necessary to detect a defect with such a size as buried in a pixel positional deviation, expansion/contraction noise, or sensing noise of an image according to advance of fineness of a pattern on a transfer mask for lithography, which results in limitation in the direct comparison method.

SUMMARY OF THE INVENTION

The present invention has been made in view of these circumstances, and an object thereof is to provide a pattern inspecting method that can detect a defect with such a size as buried in a pixel positional deviation, expansion/contraction noise or sensing noise of an image rapidly.

According to a first aspect of the present invention, there is provided a pattern inspecting method which irradiates light on a sample to be inspected having a pattern, acquires a pattern image to be inspected by detecting reflection light or transmission light from the sample to be inspected and inspects presence/absence of a defect in a pattern of the sample to be inspected based upon the acquired pattern image to be inspected according to an aspect of the present invention includes: performing a pixel positional deviation correcting operation, the performing of the pixel positional deviation correcting operation including: superimposing a partial pattern image to be inspected obtained by dividing the pattern image to be inspected acquired from the sample to be inspected and a partial inspection reference pattern image which is obtained by dividing an inspection reference pattern image of the sample to be inspected and corresponds to the partial pattern image to be inspected on one another; correcting a pixel positional deviation between the partial inspection reference pattern image and the partial pattern image to be inspected under such a condition that a sum of squares of level differences between both the partial pattern images becomes the minimum; and performing a processing for the pixel positional deviation correction on all the partial pattern images to be inspected obtained by the division.

According to a second aspect of the present invention, there is provided a pattern inspecting method, comprising: irradiating light on a sample to be inspected having a pattern; acquiring a pattern image to be inspected by detecting reflection light or transmission light from the sample to be inspected; and inspecting presence/absence of a defect in a pattern of the sample to be inspected based upon the acquired pattern image to be inspected.

DETAILED DESCRIPTION OF THE INVENTION

A pattern inspecting method according to an embodiment of the present invention will be explained below with reference to the drawings.

Figure 2:
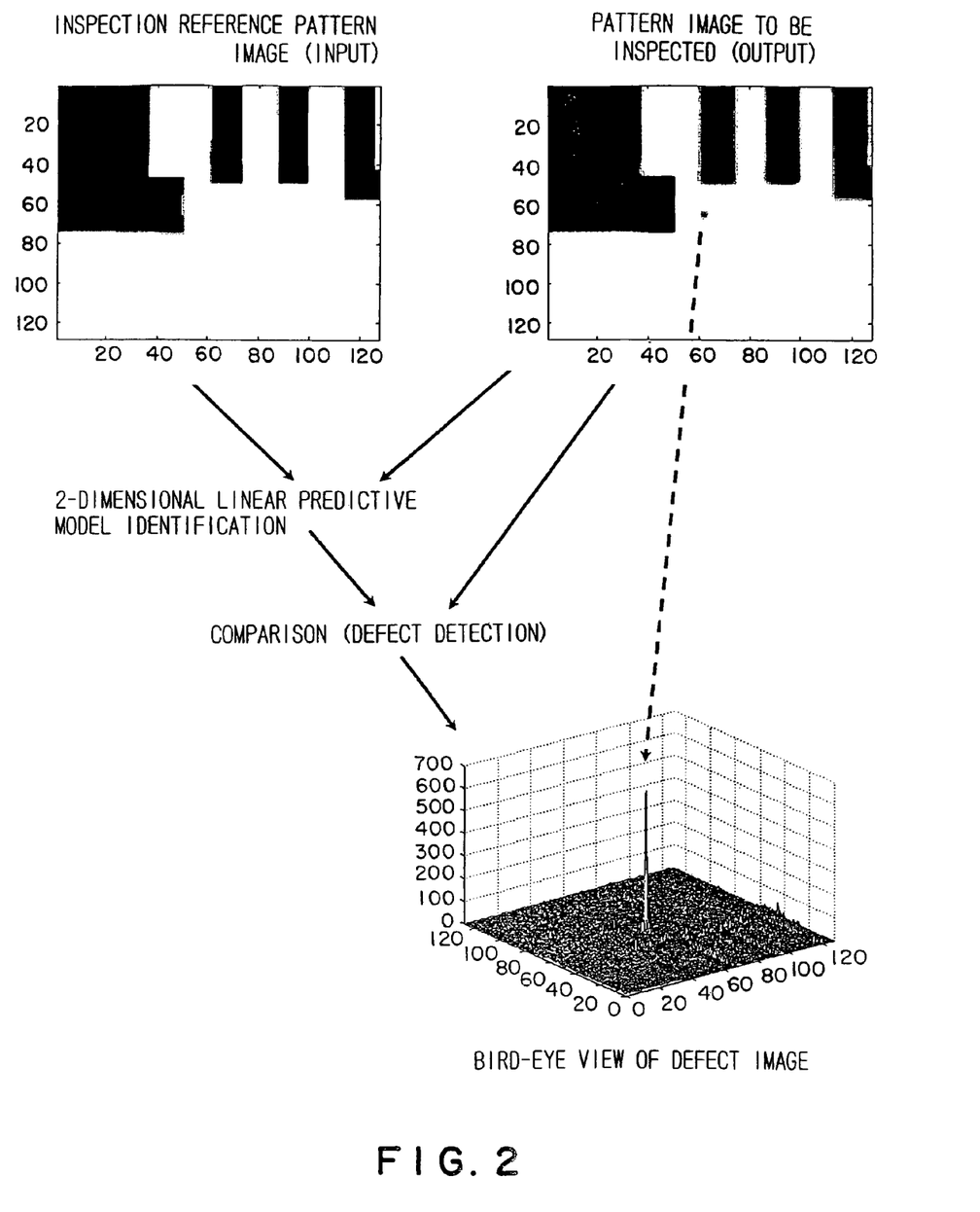
FIG. 2 is a conceptual diagram showing a principle of the pattern inspecting method according to the embodiment of the present invention.

First of all, prior to specific explanation about a pattern inspecting method according to the embodiment of the invention, a concept of the pattern inspecting method according to the embodiment will be explained. The pattern inspecting method according to the embodiment exceeds the limitation in the direct comparison method explained in the Background Art. As shown in FIG. 2, the pattern inspecting method according to the embodiment is constituted such that an identification model where a pixel positional deviation, expansion/contraction noise, or sensing noise of an image are absorbed (fitted) by performing on-line identification using, for example, a two-dimensional linear prediction model identifying method during inspection of a relationship between an inspection reference pattern image and a pattern image to be inspected, an inspection reference pattern image obtained from the identification mode and a pattern image to be inspected are compared with each other, and a defect is detected based upon the comparison result.

Figure 3:
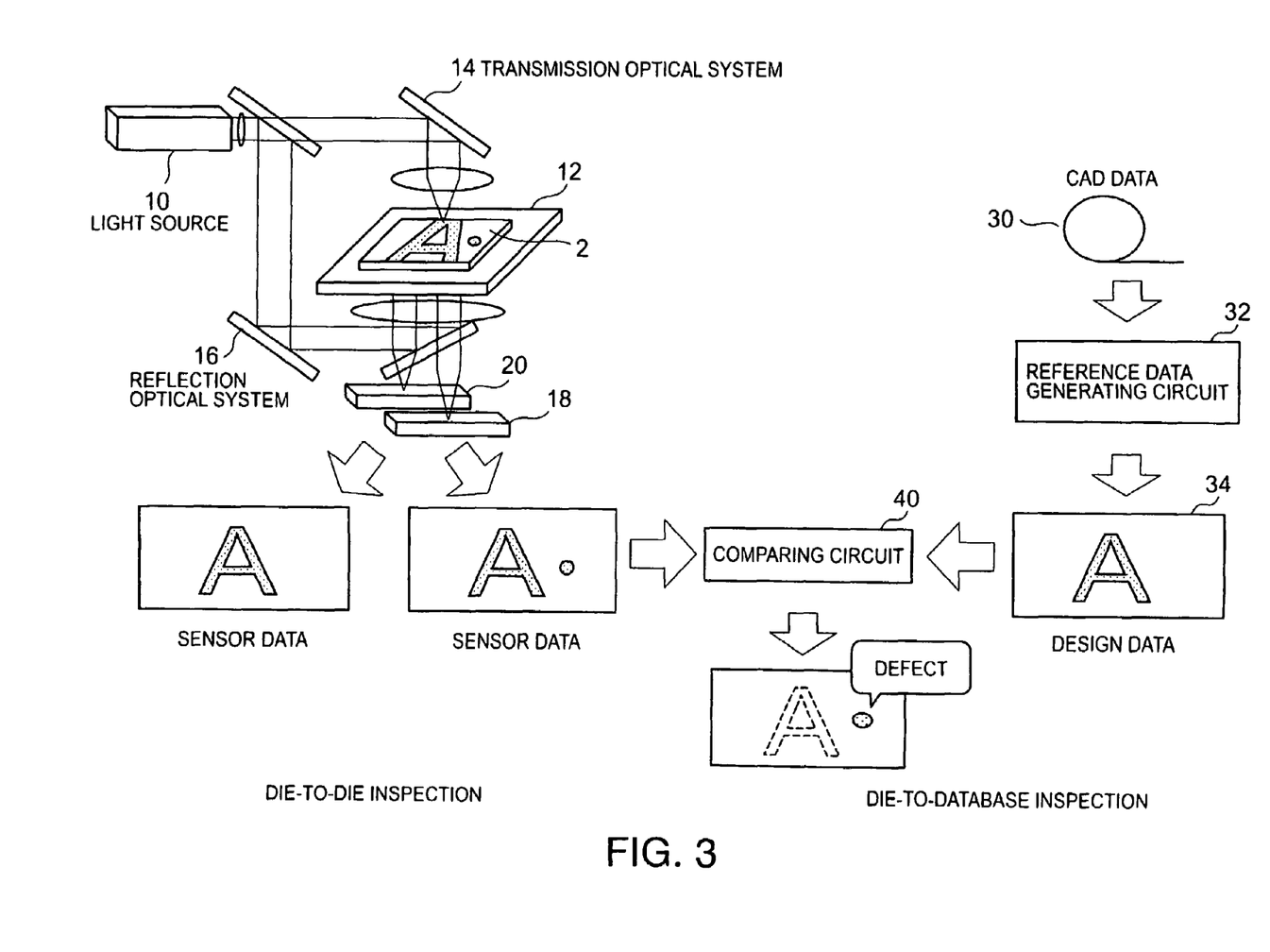
FIG. 3 is a diagram showing a specific constitution of a pattern inspecting apparatus.

The pattern inspecting method according to the embodiment of the present invention is performed using a pattern inspecting apparatus provided with an irradiating unit for irradiating light on a sample to be inspected, and an image acquiring unit for detecting reflection light or transmission light from the sample to be inspected to acquire a pattern image. A specific configuration of the pattern inspecting apparatus is shown in FIG. 3. As shown in FIG. 3, the pattern inspecting apparatus is provided with a light source 10 that emits light, a stage 12 on which a sample to be inspected (transfer mask) 2 is placed, a stage driving system (not shown) that drives the stage, a transmission optical system 14 constituted such that the sample to be inspected 2 that is placed on the stage 12 transmits light from the light source 10, a reflection optical system 16 constituted such that light from the light source 10 is irradiated on the sample to be inspected 2 that has been placed on the stage 12 and reflection light from the sample 2 can be detected, a transmission light sensor 18 that detects transmission light through the transmission optical system 14, and a reflection light sensor 20 that detects reflection light from the reflection optical system 16. The transmission optical system 14 and the reflection optical system 16 are each constituted of, for example, a half mirror and a convex lens. The light irradiating unit includes the light source 10 and at least one of the transmission optical system 14 and the reflection optical system 16, and the image acquiring unit includes at least one of the transmission light sensor 18 and the reflection light sensor 20.

The Die to Die comparison method is a method for detecting a defect by using at least one of transmission light and reflection light to compare sensor data about two dies on the transfer mask 2 that have been recorded on the sensor 18 or the sensor 20 with each other in a comparison circuit 40, while the Die to Database comparison method is a method for detecting a defect by using at least one of transmission light and reflection light to compare a sensor data item about a die on the transfer mask 2 that have been recorded on the sensor 18 or the sensor 20 and a design data item 34 generated from a reference data generating circuit 32 based upon CAD data for LSI design 30 with each other in the comparison circuit 40.

Figure 4:
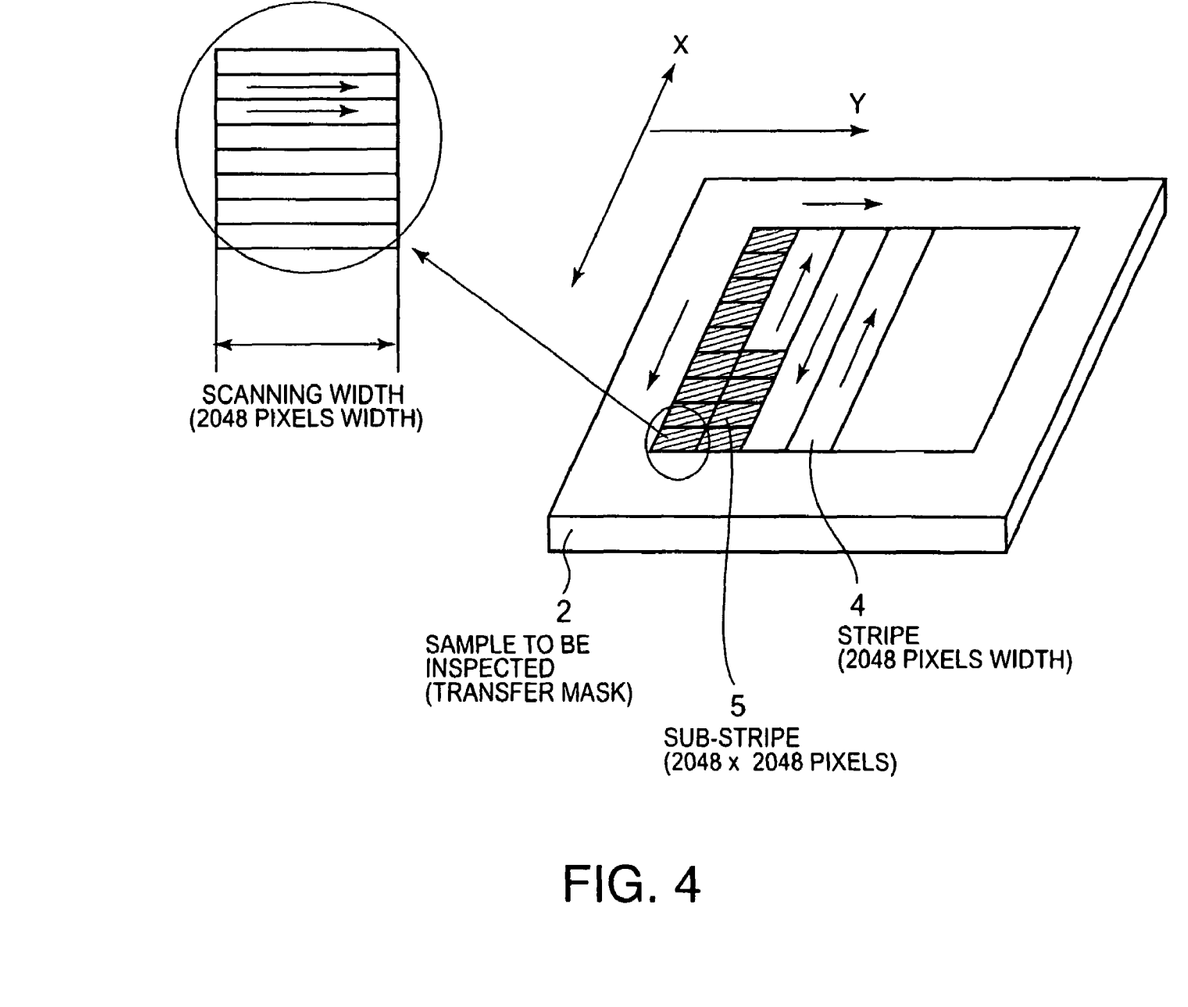
FIG. 4 is a diagram for explaining image acquisition performed according to mask scanning using a line sensor.

Thus, a pattern image depicted on a transfer mask is acquired by a pattern inspecting apparatus shown in FIG. 3, for example. In detail, the pattern image is acquired by scanning a transfer mask for lithography 2 using a line sensor, as shown in FIG. 4. For convenience's sake, one piece of rectangles 4 obtained by slitting the transfer mask 2 in an X-axial direction (one side direction of the transfer mask 2) shown in FIG. 4 is called "one stripe" and one square image 5 obtained by further cutting one stripe in a Y-axial direction (a direction perpendicular to the X-axial direction) is called "one sub-stripe". One sub-stripe is constituted of 2048×2048 pixels. Inspection for presence/absence of a detect is performed for each sub-stripe. Incidentally, one pixel is defined by grayscale of 256 gradations.

In the following embodiment, only a pattern inspecting method in one sub-stripe is explained, but the pattern inspecting method in one sub-stripe is sequentially applied to respective sub-stripes over a whole face of the transfer mask 2 shown in FIG. 4.

Embodiment

Figure 1:
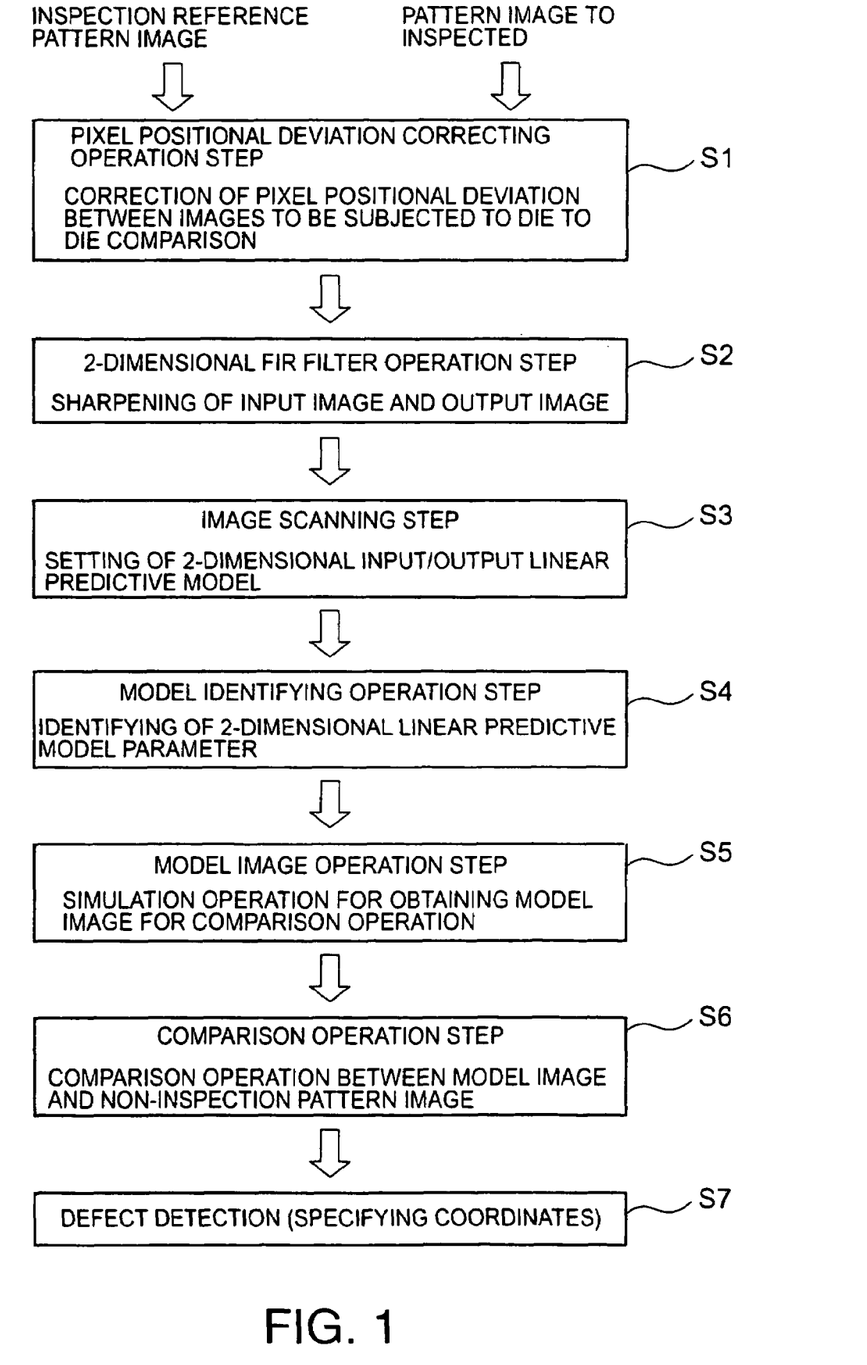
FIG. 1 is a flowchart showing an inspecting procedure for a pattern inspecting method according to an embodiment of the present invention.

A flowchart representing an inspecting procedure of a pattern inspecting method according to one embodiment of the present invention is shown in FIG. 1. A defect inspecting method using the Die to Die comparison method will be explained for each step with reference to FIG. 1. Incidentally, it is assumed that two dies to be compared are specified in advance, and respective images of an inspection reference pattern image and a pattern image to be inspected have been acquired, for example, by the pattern inspecting apparatus shown in FIG. 3.

(a) Pixel positional deviation correcting operation step S1: correction for pixel positional deviation between images to be subjected to Die to Die comparison.

As preparation for comparing an inspection reference pattern image and a pattern image to be inspected, first, both the images are superimposed on one another and pixel positional deviation is corrected so as to minimize an evaluation function expressed by a sum of squares of level differences of respective pixels.

In this case, in order to reduce influence of expansion/contraction noise on an image, one sub-stripe is divided to 16 pieces and a positional deviation is corrected within a range of 512×512 pixels (hereinafter, called "one frame"). Incidentally, when a pixel positional deviation is corrected, a surrounding area about each piece is cut off and only an image with a range of less than 512×512 pixels is obtained, so that a region which can not be inspected occurs within one sub-stripe. Therefore, division is conducted in advance such that slightly larger images overlap with each other at their surrounding areas. Incidentally, even if such a division is employed, a surrounding area of one sub-stripe can not be inspected. However, when one stripe or one sub-stripe is acquired, it is acquired so as to overlap with another strip or another sub-stripe at its surrounding area, so that inspection to a whole face of the mask is not injured. Incidentally, in step S1, compensation for a positional pixel deviation less than one pixel size can not be achieved, and an identifying operation step described later is further required.

(b) Two-dimensional FIR (Finite Response) filter operation step S2: sharpening of an input image and an output image.

When contrast in each image is weak, or when importance is placed on detection of a pinhole defect, a pin-dot defect, or the like, image sharpening can be performed by adding an image obtained by performing an 8-direction Laplacian operation processing (a 2-dimensional FIR filter operation frequently used for image processing) on a surrounding area of each of an inspection reference pattern image and a pattern image to be inspected.

(c) Image scanning step S3: setting of 2-dimensional input/output linear predictive model Here, a method for setting a 2-dimensional input/output linear predictive model by regarding an inspection reference pattern image corrected in step S1 and further sharpened in step S2 and a pattern image to be inspected applied with operation processings in steps S1 and S2 as 2-dimensional input data and 2-diemsional output data will be explained. An example for setting 5×5-order 2-dimensional linear predictive model using a region constituted of 5×5 pixels will be explained due to space limitation.

It is first assumed that suffixes of data used in a 5×5-order 2-dimensional linear predictive model are taken as shown in the following table, and 2-dimenisional input data and 2-dimensional output data are respectively expressed as $u(i,j)$ and $y(i,j)$.

|   | 0 | 1 | 2 | 3 | 4 |
|---|---|---|---|---|---|
| 0 | i−2, j−2 | i−2, j−1 | i−2, j | i−2, j+1 | i−2, j+2 |
| 1 | i−1, j−2 | i−1, j−1 | i−1, j | i−1, j+1 | i−1, j+2 |
| 2 | i, j−2 | i, j−1 | i, j | i, j+1 | i, j+2 |
| 3 | i+1, j−2 | i+1, j−1 | i+1, j | i+1, j+1 | i+1, j+2 |
| 4 | i+2, j−2 | i+2, j−1 | i+2, j | i+2, j+1 | i+2, j+2 |

Here, i, j represent coordinates of each pixel, where i, j=2, 3, . . . . That is, suffixes of a pixel of interest are represented as i, j, and suffixes of a total of 24 pixels which surround the pixel and are positioned just before two rows and two columns and just after two rows and two columns are set as described in the above table.

Unknown parameters to be identified in an identifying operation step S4 explained latter are expressed as $a_{00}$ to $a_{44}$ and $b_{00}$ to $b_{44}$ (incidentally, $a_{22}=1$), and a relational equation (1) shown below is set to a set of pixel data for 5×5 regions.

$$y_k = a_{22}y(i,j) = \quad (1)$$
$$y(i,j) = -a_{00}y(i-2,j-2) - a_{01}y(i-2,j-1) - a_{02}y(i-2,j) -$$
$$a_{03}y(i-2,j+1) - a_{04}y(i-2,j+2) - a_{10}y(i-1,j-2) -$$
$$a_{11}y(i-1,j-1) - a_{12}y(i-1,j) - a_{13}y(i-1,j+1) -$$
$$a_{14}y(i-1,j+2) - a_{20}y(i,j-2) - a_{21}y(i,j-1) -$$
$$a_{23}y(i,j+1) - a_{24}y(i,j+2) - a_{30}y(i+1,j-2) -$$
$$a_{31}y(i+1,j-1) - a_{32}y(i+1,j) - a_{33}y(i+1,j+1) -$$
$$a_{34}y(i+1,j+2) - a_{40}y(i+2,j-2) - a_{41}y(i+2,j-1) -$$
$$a_{42}y(i+2,j) - a_{43}y(i+2,j+1) - a_{44}y(i+2,j+2) +$$
$$b_{00}u(i-2,j-2) + b_{01}u(i-2,j-1) + b_{02}u(i-2,j) +$$
$$b_{03}u(i-2,j+1) + b_{04}u(i-2,j+2) + b_{10}u(i-1,j-2) +$$
$$b_{11}u(i-1,j-1) + b_{12}u(i-1,j) + b_{13}u(i-1,j+1) +$$
$$b_{14}u(i-1,j+2) + b_{20}u(i,j-2) + b_{21}u(i,j-1) + b_{22}u(i,j) +$$
$$b_{23}u(i,j+1) + b_{24}u(i,j+2) + b_{30}u(i+1,j-2) +$$
$$b_{31}u(i+1,j-1) + b_{32}u(i+1,j) + b_{33}u(i+1,j+1) +$$
$$b_{34}u(i+1,j+2) + b_{40}u(i+2,j-2) - b_{41}u(i+2,j-1) +$$
$$b_{42}u(i+2,j) + b_{43}u(i+2,j+1) + b_{44}u(i+2,j+2) + \varepsilon(i,j)$$

Incidentally, $\epsilon(i,j)$ represents noise. That is, Equation (1) indicates such a fact that data obtained by applying linear conversion to 2-dimensional input data and data obtained by applying another linear conversion to 2-dimensional output are approximately the same except for noises.

The Equation (1) is one of non-causal models (see "Linear predictive method in multi-dimensional digital signal processing" by Taguchi and Hamada, COMPUTROL" No. 30, pp. 50-60, Corona Publishing, 1990), and it means that data $y_k=y(i,j)$ of one pixel in a pattern image to be inspected can be represented with a linear coupling of data to be inspected of 5×5 pixels thereabout and inspection reference data of 5×5 pixels corresponding to these pixels. Here, statistical properties of the noise $\epsilon$ in the equation (1) are unclear, and the result from parameter identification obtained by the least-squares method described later may have bias. However, it is considered that, by increasing the order of the 2-dimensional linear predictive model, for example, by increasing the order to 7 to prepare (7×7) 2-dimensional linear predictive modes, respective components of noise are taken in the respective models so that the noise $\epsilon$ approach to white noise. Accordingly, accuracy of the least-squares method can be improved, as described latter. Incidentally, in the embodiment of the present invention, since values of parameters themselves have no meaning, so that any adverse effect does not occur in particular.

The Equation (1) is expressed by vector as follows:

Unknown parameter vector: $\theta=[a_{00}, a_{01}, \ldots, a_{44}, b_{00}, b_{01}, \ldots, b_{44}]^T$ Data vector: $x_k=[-y(i-2,j-2), -y(i-2,j-1), \ldots, -y(i+2,j+2), u(i-2,j-2), u(i-2,j-1), \ldots, u(i+2,j+2)]^T$ $$x_k^T \theta = y_k \quad (2)$$

As apparent from Equation (1), the number of elements of unknown parameter vector θ in Equation (2) is as follows:

$$5 \times 5 \times 2 - 1 = 49 \text{ pieces} \quad (3)$$

Therefore, unknown parameters can be identified by scanning coordinates i, j of an inspection reference pattern image and a pattern image to be inspected (in this example, it is assumed that a scanning origin is set to a left upper point, scanning from left to right downwardly is repeated, and the scanning is terminated at a right lower point) and making 49 sets of data simultaneous. Incidentally, in the image scanning step S3, such a constitution may be employed that data of the inspection reference pattern image and the pattern image to be inspected are thinned so that the next model identifying operation step S4 is made faster.

(d) Model identifying operation step S4: identification of 2-dimensional linear predictive model parameter In fact, from a statistical viewpoint, simultaneous equations made redundant is solved by preparing n (>49) sets of data like Equation (4) to apply the batch type least-squares method (see "INTRODUCTION TO SYSTEM IDENTIFICATION" by Katayama, pp 71-82, Asakura Shoten, 1994, for example) to the data.

$$\begin{bmatrix} x_1^T \\ \vdots \\ x_n^T \end{bmatrix} \theta = \begin{bmatrix} y_1 \\ \vdots \\ y_n \end{bmatrix} \Rightarrow X\theta = y \Rightarrow \theta = (X^T X)^{-1} X^T y \quad (4)$$

Here, $X=[x_1, x_2, \ldots, x_n]^T$, $y=[y_1, y_2, \ldots, y_n]^T$, and $x_k^T \theta = y_k$ (k=1, 2, ... n).

The simultaneous equation in Equation (4) is called "normal equation". For example, when the inspection reference pattern and the pattern image to be inspected are each constituted of 512×512 pixels, since pixels about each image can be reduced for each two pixels by scanning 5×5-order models, data shown in the following equation (5) can be obtained $$(512-4) \times (512-4) = 258064 \text{ sets} \quad (5)$$

Thus, a sufficient number of data can be secured statistically.

However, since pixels about an image are cut off in the signal processings in step S2 and step S3, when a slightly larger image is set in advance so as to go back to step S1 and secure 512×512 pixels in level of Equation (5), pixels which can not be inspected are prevented from occurring.

Now, solving the simultaneous equation of Equation (4) while holding one frame is a heavy operation. When 7×7-order models are employed, the number of parameters to be identified is increased up to the number shown in the following Equation (6)

$$7 \times 7 \times 2 - 1 = 97 \text{ pieces} \quad (6)$$

Accordingly, the operation becomes heavier. Therefore, by further diving one frame into 16 pieces, Equation (4) is solved in a region constituted of 128×128 pixels (hereinafter, called "1 unit"). Thereby, a mechanism performing operation by 16 operation devices arranged in parallel can be constructed so that throughput of inspection about presence/absence of a defect can be improved. Further, in such a case that expansion/contraction noise within one frame image is large, a region supported by one set of model parameters is reduced to 1/16 by dividing one frame to respective unit, so that noise ε in Equation (1) can be reduced to improve accuracy for model identification.

Here, even if an image size to be subjected to an operation is reduced to one frame to one unit, when the simultaneous equations of Equation (4) can not be solved due to constraint from the operation device, the recursive least-squares method with a forgetting factor (see "INTRODUCTION TO SYSTEM IDENTIFICATION" by Katayama, pp 71-82, Asakura Shoten, 1994, for example) can be used. The algorithm is practical, because it does not requires solving the normal equation and a solution obtained by repetitive use over 2 to 3 times gradually approaches to a solution of a batch type least-squares method. However, since the recursive least-squares method with a forgetting factor is a sequential operation, it is to be noted that it is disadvantage regarding improvement in inspection throughput, and the solution obtained by the recursive least-squares method with a forgetting factor and that obtained by the batch type least-squares method are not coincident with each other severely.

Incidentally, when the recursive least-squares method is used, a converging status of a parameter identified by scanning a defect portion develops discontinuous behavior corresponding to a size of a defect. Therefore, such an advantage can be obtained that coordinates of a defect can be specified.

Besides, for an image which does not require a precise identification of a parameter in such a case that it is known that a pattern is monotonous, an operation amount can be reduced by thinning data to be scanned or decreasing the order of the model, which can contribute to improvement in inspection throughput. This approach can be utilized for picking up only a large defect in advance too.

(e) Model image operation step S5: simulation operation for obtaining a model image for comparison operation By substituting the identified parameter θ and input/output data used for the identification in Equation (1) and performing simulation operation scanning coordinates i,j of a pixel, a model image for comparison operation used in the next step S6 can be obtained. The model image absorbs (performs fitting on) a pixel positional deviation less than one pixel, expansion/contraction noise, or sensing nose which has not been solved in step S1 owing to behavior of the least-squares method. Of course, a defective pixel(s) is eventually contained in data used for simulation, but the number of defective pixels is extremely reduced as compared with the total number of data used for identification, so that the defective pixels are not subjected to fitting in the least-squares method and they do not appear in the Model image (when model order is set to be excessively high, fine defects may be subjected to fitting). In the next comparison operation step S6, the phenomenon is utilized.

(f) Comparison operation step S6: Comparison operation between a model image and a pattern image to be inspected After a model image and a pattern image to be inspected are compared with each other (indirect comparison), and noise removal is performed by applying a 2-dimensional FIR filter operation processing (such a processing as addition of data of 8 surrounding pixels about a pixel to be subjected to operation) to a square error pattern image where square of a level difference between pixels of the model image and the pattern image to be inspected corresponding to each other becomes a level of a corresponding pixel, coordinates of a defective pixel in the pattern image to be inspected is specified by performing a threshold operation processing.

Figure 5:
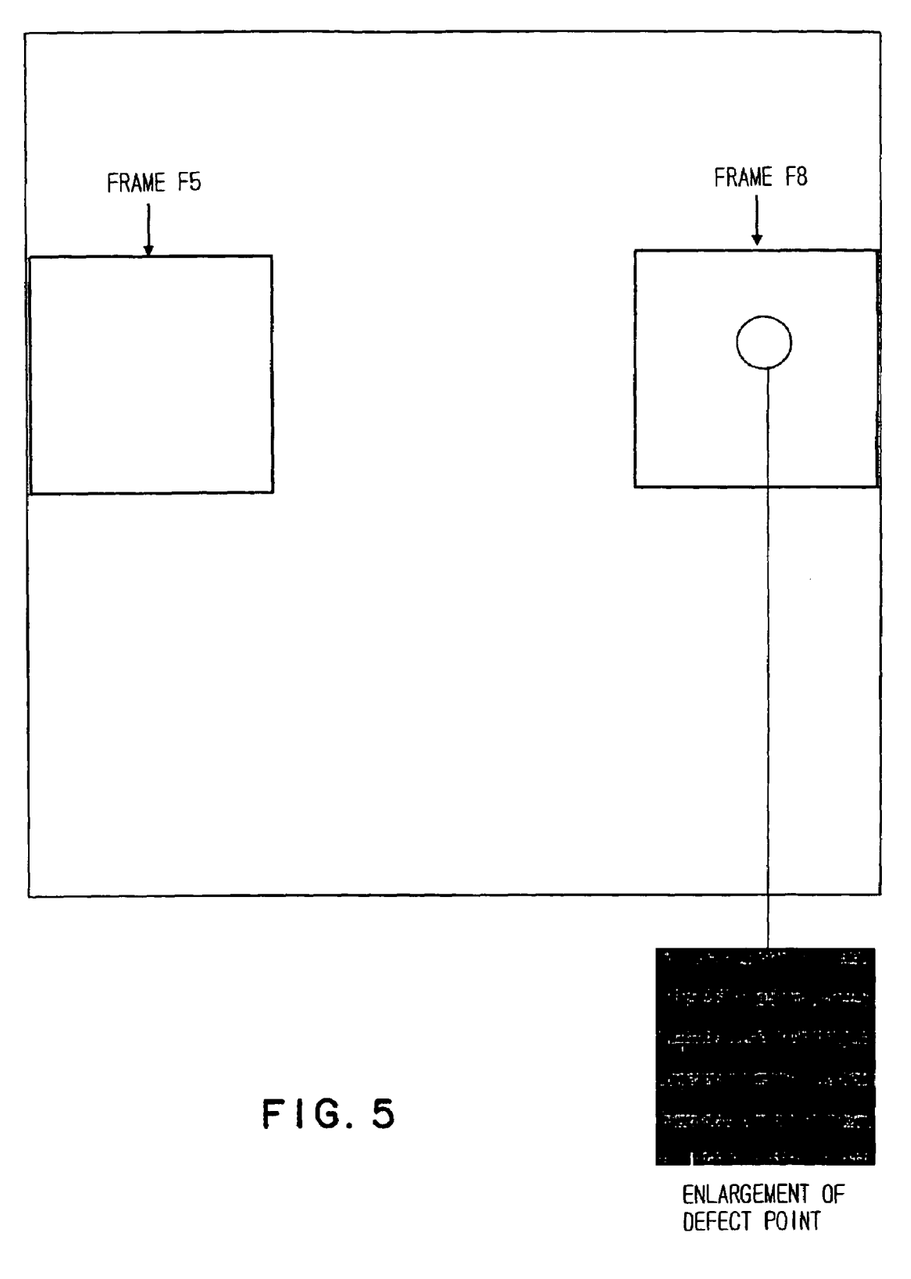
FIG. 5 is an illustrative diagram of a pattern image to be inspected in one sub-stripe including a pin-dot defect.
Figure 6:
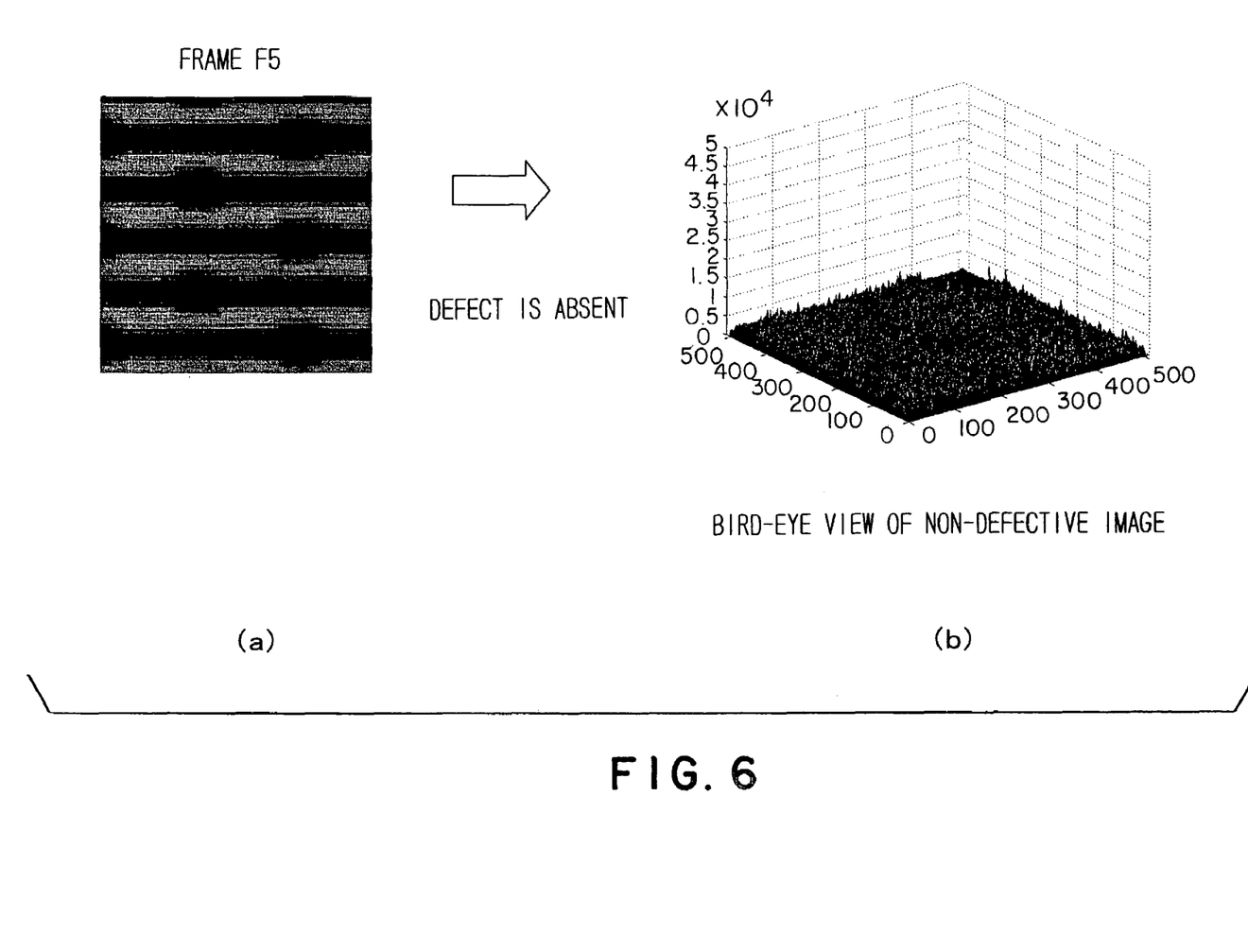
FIGS. 6(a) and 6(b) are diagrams showing the result from a defect detection simulation using a frame image with no defect in one sub-stripe.
Figure 7:
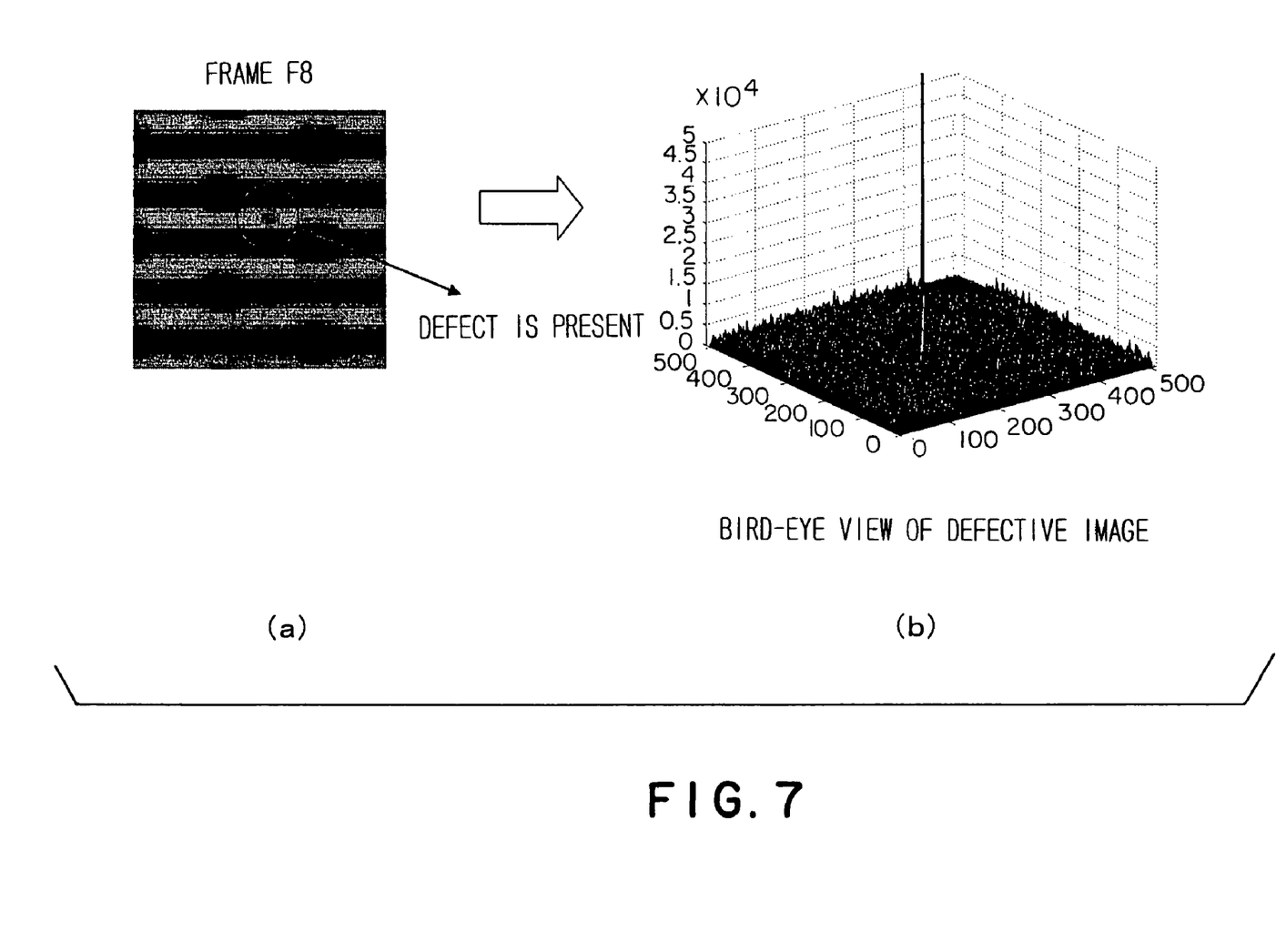
FIGS. 7(a) and 7(b) are diagram showing the result from a defect detection simulation using a frame image with a defect in one sub-stripe.

A coordinate detecting simulation result to an actual defective pixel will be explained with reference to FIGS. 5 to 7(b). FIG. 5 is a diagram illustratively showing only a frame F5 and a frame F8 of frames obtained by dividing a pattern image to be inspected (transmission illumination) of one sub-stripe 5 including a pin-dot defect into 16 frames (512×512 pixels). FIG. 6(*a*) shows an image of the frame F5 which does not include a defect, and FIG. 6(*b*) shows a simulation result about the frame F5 which does not include a defect. FIG. 7(*a*) shows an image of the frame F8 including a pin-dot defect and FIG. 7(*b*) shows a simulation result about the frame F8 including a pin-dot defect. It is understood that the square error pattern is flat and a defect is not detected regarding the frame F5 and the square error pattern projects at a position of the defective pixel and coordinates of the defective pixel can be specified regarding the frame F8.

When a projection due to the square error is small and determination can not be made about whether or not the projection indicates presence of a defective pixel, such a process as substitution of input/output data or majority decision can be adopted.

As explained above, according to the embodiment, a defect such as buried in a pixel positional deviation, expansion/contraction noise, or sensing noise in an image can be detected rapidly.

Next, application examples of Die to Database comparison method or simultaneous transmission and reflection comparison method other than the Die to Die comparison method will be described mainly based upon images obtained by reflection illustration.

Images used in respective comparison methods are shown in FIGS. 8A to 8E.

Figure 8A:
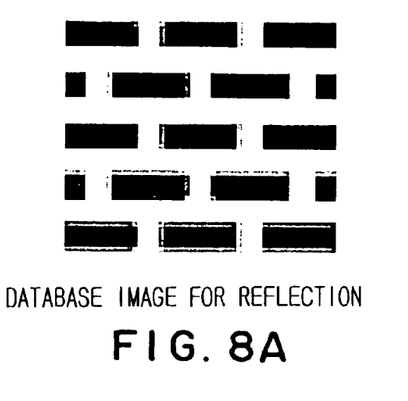
FIGS. 8A to 8E are diagrams showing image examples obtained by performing filter processing on a transmission image, a reflection image, and database.
Figure 8B:
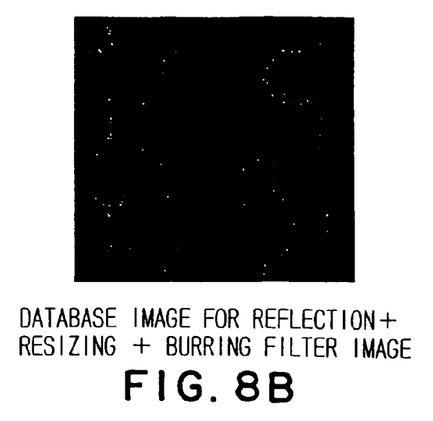
Figure 8C:
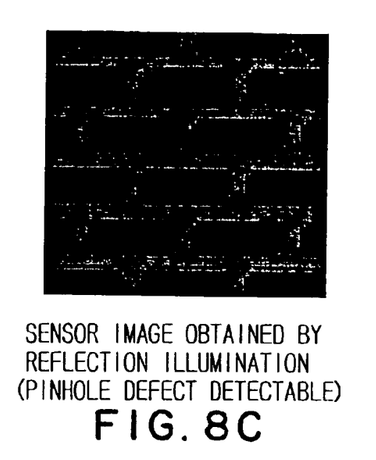
Figure 8D:
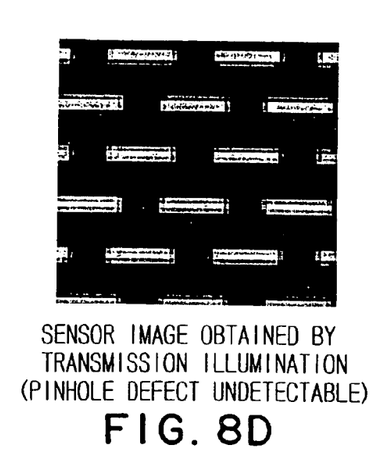
Figure 8E:
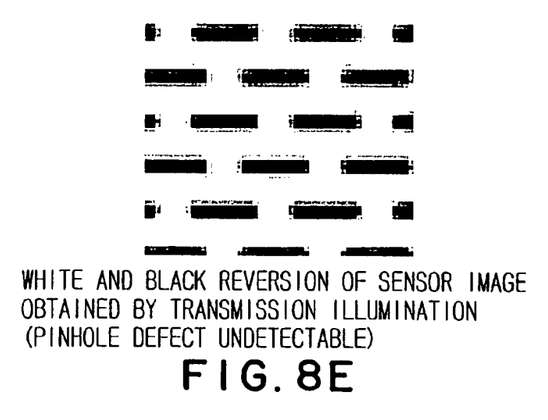

FIG. 8A shows a database image for reflection, FIG. 8B shows an image obtained by application of (database for reflection+resizing+burring filter), FIG. 8C shows a sensor image obtained by reflection illumination (pin-hole defect detectable), FIG. 8D shows a sensor image obtained by transmission illumination (pinhole defect undetectable), and FIG. 8E shows white and back reversion of a sensor image obtained by transmission illumination (pin-hole defect undetectable).

It is understood from FIGS. 8A to 8E that a pinhole defect can be detected by reflection illumination but it can not be detected by transmission illumination.

The embodiment has such general versatility as applicable to a pattern image generated by database. However, when a sharpening filter is used, it is required that an image is smooth, and FIG. 8B showing an image obtained by application of resizing+blurring filter has been prepared in this case. Incidentally, the term "resizing" includes expanding, contracting, and rounding.

In order to perform simultaneous transmission and reflection comparison, FIG. 8E showing an image obtained by reversing white and back has been prepared.

Figure 9A:
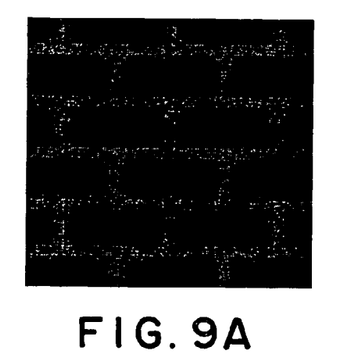
FIGS. 9A to 9C are diagrams showing the result from a simulation of a reflection database inspection to a pinhole defect.
Figure 9B:
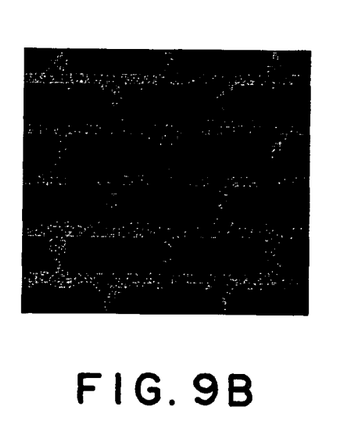
Figure 9C:
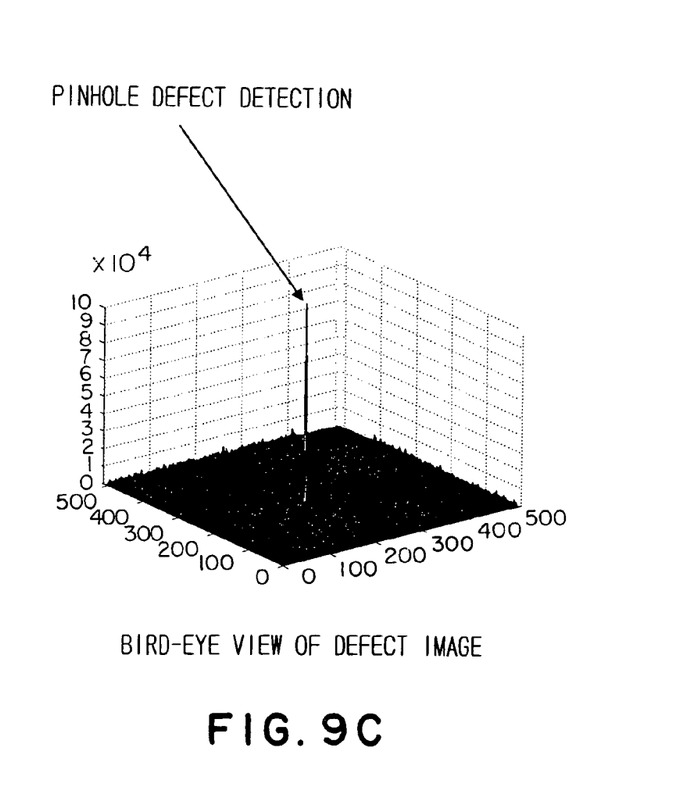
Figures 10A, 10B, 10C:
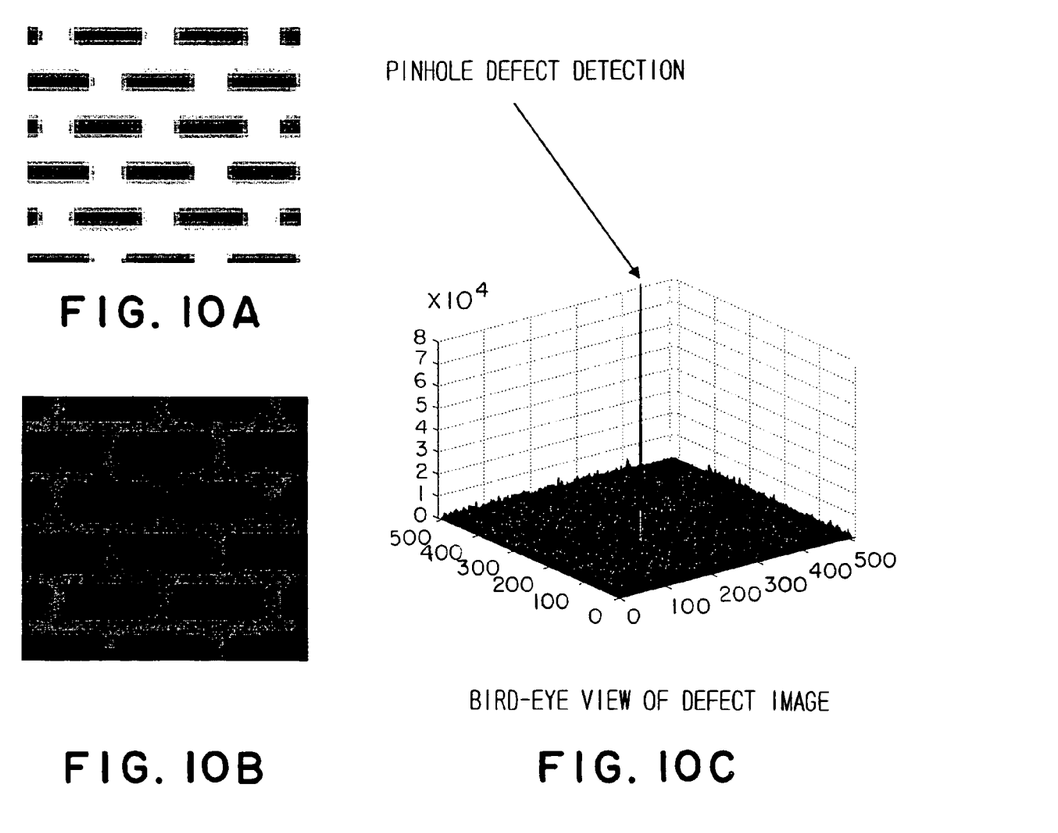
FIGS. 10A to 10C are diagrams showing the result from a simulation of a simultaneous transmission and reflection inspection to a pinhole defect.

FIG. 9A shows an image obtained by application of (database for reflection+resizing+burring filter) shown in FIG. 8B, FIG. 9B shows a sensor image obtained by reflection illumination shown in FIG. 8C, and FIG. 9C shows a simulation result obtained by reflection database inspection. FIG. 10A is a white and black reversion of a sensor image obtained by transmission illumination shown in FIG. 8E, FIG. 10B shows a sensor image obtained by reflection illumination shown in FIG. 8C, and FIG. 10C shows a simulation result obtained by simultaneous transmission and reflection inspection.

It is understood from the simulation results shown in FIGS. 9C and 10C that pinhole defects could have been detected in the above two examples.

As described above, according to the embodiment, even if pattern fineness of a pattern on a transfer mask advances, such a defect as buried in pixel positional deviation, expansion/contraction noise, or sensing noise on an image can be detected. Since a sensor property or a die property is identified in an on-line manner, such an advantage can be attained that the number of parameters to be set for operation for an inspecting apparatus can be reduced.

In addition to the above embodiment, since various combinations derived from the appending claims can be thought and other approaches regarding various operations such as FIR filter or the solution of the least-squares method are thought, the present invention is not limited to the embodiment described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A pattern inspecting method used in a pattern inspecting apparatus for inspecting presence/absence of a defect in a fine pattern formed on a transfer mask for lithography, and which irradiates light on a sample to be inspected having a pattern, acquires a pattern image to be inspected by detecting reflection light or transmission light from the sample to be inspected and inspects presence/absence of a defect in a pattern of the sample to be inspected based upon the acquired pattern image to be inspected, the method comprising:

performing a pixel positional deviation correction operation, including:

superimposing on one another a partial pattern image to be inspected and a partial inspection reference pattern image, said partial pattern image to be inspected obtained by dividing the pattern image to be inspected acquired from the sample to be inspected, said partial inspection reference pattern image obtained by dividing an inspection reference pattern image of the sample to be inspected and corresponding to the partial pattern image to be inspected;

correcting a pixel positional deviation between the partial inspection reference pattern image and the partial pattern image to be inspected under such a condition that a sum of squares of level differences between both the partial pattern images becomes minimum;

performing a processing for the pixel positional deviation correction on all the partial pattern images to be inspected obtained by the division;

collecting pattern image data corrected regarding the pixel positional deviation by regarding the partial inspection reference pattern image corrected regarding the pixel positional deviation and the partial pattern image to be inspected as 2-dimensional input data and 2-dimensional output data, respectively, and scanning the inspection reference pattern image and the pattern image to be inspected in order to set a 2-dimensional input/output linear predictive model having a parameter;

performing an identifying operation for identifying the parameter of the 2-dimensional input/output linear predictive model using least-squares method based upon the collected pattern image data;

performing a model image operation to obtain a model image corresponding to the partial inspection reference pattern image by a simulation operation using the parameter of the identified 2-dimensional input/output linear predictive model; and performing a comparison operation to compare the model image with the partial pattern image to be inspected to obtain a square error pattern image, to remove noise from the square error pattern image, and to perform a threshold operation processing to specify coordinates of a defective pixel in the partial pattern image to be inspected.

2. The pattern inspecting method according to claim 1, further comprising sharpening each of the partial inspection reference pattern image and the partial pattern image to be inspected using a 2-dimensional FIR filter for sharpening.

3. The pattern inspecting method according to claim 1, wherein the inspection reference pattern image and the pattern image to be inspected are respectively divided to pluralities of regions in advance, and the pixel positional deviation correcting operation, the collecting of the corrected pattern image data, the identifying operation, the model image operation, and the comparison operation are performed in a parallel operation.

4. The pattern inspecting method according to claim 1, wherein the noise removal in the comparison operation is performed by performing a 2-dimensional FIR filter operation processing.

5. The pattern inspecting method according to claim 1, where the inspection reference pattern image is a pattern image acquired from the sample to be inspected and different from the pattern image to be inspected.

6. The pattern inspecting method according to claim 1, wherein the inspection reference pattern image is a pattern image obtained by detecting transmission light from the sample to be inspected and the pattern image to be inspected is a pattern image acquired by detecting reflection light from the sample to be inspected.

7. The pattern inspecting method according to claim 1, wherein the inspection reference pattern image and the pattern image to be inspected are acquired at the same time.

8. The pattern inspecting method according to claim 1, wherein the inspection reference pattern image is a developed pattern image developed from design data for a pattern of the sample to be inspected.

9. The pattern inspecting method according to claim 8, wherein the inspection reference pattern image is a pattern image obtained by performing such a filter processing as expanding/contracting/rounding/burring on the developed pattern image and substituting the developed pattern image with a simulation pattern image obtained by simulating an etching process or an optical system for image acquisition.

10. The pattern inspecting method according to claim 2, wherein the inspection reference pattern image and the pattern image to be inspected are respectively divided to pluralities of regions in advance, and the pixel positional deviation correcting operation, the collecting of the corrected pattern image data, the identifying operation, the model image operation, and the comparison operation are performed in a parallel operation.

11. The pattern inspecting method according to claim 2, wherein the noise removal in the comparison operation is performed by performing a 2-dimensional FIR filter operation processing.

* * * * *